United States Patent Office

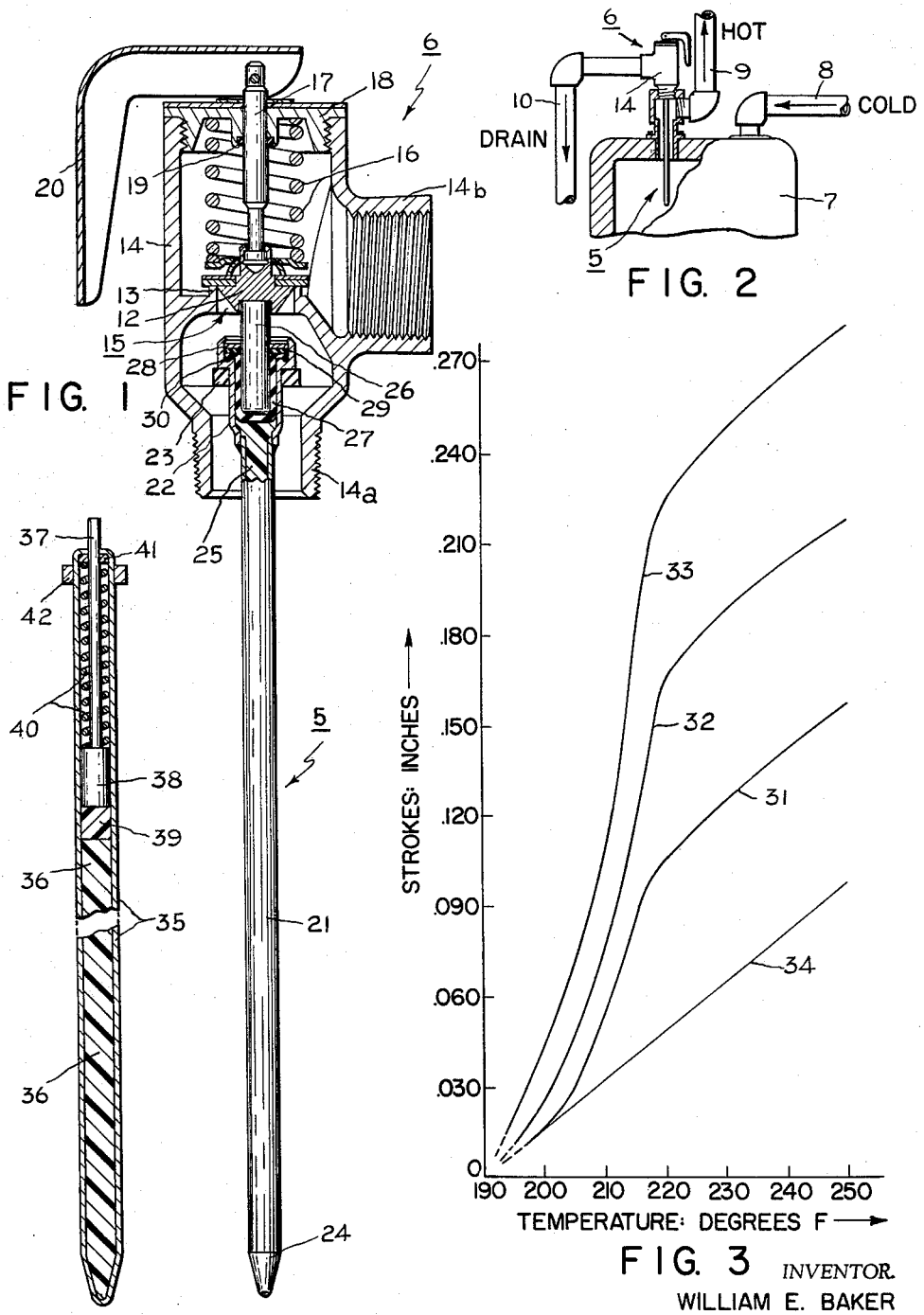

3,194,009
Patented July 13, 1965

3,194,009
THERMAL ACTUATORS
William E. Baker, Wellesley, Mass., assignor to Baker Research and Development Corporation, Waltham, Mass., a corporation of Delaware
Filed Sept. 20, 1963, Ser. No. 310,243
10 Claims. (Cl. 60—23)

The present invention relates to the improvement of thermally responsive devices such as those which mechanically actuate valves or switches, and, in one particular aspect, to novel and improved thermal actuators of low-cost fabrication in which a relief valve or the like is positively and accurately actuated by a unique temperature-responsive element including an elastomeric-type fill having particularly advantageous expansion characteristics.

It has long been well known to exploit thermally-induced dimensional variations for purposes of powering movements in control devices such as a valve or electric switch. Many of the devices which operate on this principle are intended to develop a relatively large and sudden mechanical response when they sense occurrence of temperatures within a narrow critical range, as in the case of pressure relief valves, for example. However, the dimensions of high-thrust mechanical movements obtainable with small incremental variations in temperature generally tend to be small also, and for this reason mechanical amplification has sometimes been found necessary. In the latter connection, snap-action elements have been used to augment the desired effects, although at the expense of increased complexity and cost. The basic temperature-responsive units, which are the key sensing portions of various thermostats, have assumed many forms; some have sought to take advantage of the desirably large volume expansions which are characteristic of liquids, others have relied upon differentials in the expansions of different solids, and still others have involved rubber, or paste- or pellet-like aggregations of finely-divided solids with wax. The latter substances, i.e. waxes, have been of particular interest because they can readily be formulated to melt at prescribed temperatures within ranges which are of importance in many thermostat applications, with attendant significant increases in volume. Liquids introduce difficult problems associated with maintaining absolutely tight sealing between relatively movable parts of the thermostat structure, while stiff or elastomeric or other deformable solids can avoid these particular difficulties. By way of improvement in accordance with the present teachings, materials which have elastomeric properties are uniquely associated with certain liquid materials, particularly those having properties of wax, to form thermally-responsive substances which, in thermostat structure, may, for example, expand abruptly and at exceptionally high rates within narrow critical ranges of temperatures, and which may change volume significantly without involving release of fluid. Moreover, these materials are conveniently and economically processed in liquid form and are then rendered of desired generally elastomeric form in situ.

It is one of the objects of the present invention, therefore, to provide novel and improved thermally-responsive actuators of a unique dry-fill type which are of low-cost construction which are accurate and positive in operation.

Another object is to provide improved thermal actuators including material of a solid-state type in which relatively large mechanical actuating movements of high power are developed abruptly upon exposure to temperatures within a narrow predetermined range.

A further object is to provide unique and economical manufacture of precision thermal actuator units wherein elastomeric and wax substances are together effective to convert relatively small and critical temperature changes into relatively large high-thrust movements without need for amplification.

Still further it is an object to provide a novel and improved method for production of a unique elastomeric thermally-responsive element within confines of a thermostat structure, which involves the high-temperature preparation of a special substance which is preserved in flowable form until cast in place for curing at a high temperature.

By way of a summary account of practice of this invention in one of its aspects, the movable valving member of a pressure relief valve is arranged to be lifted from a seated position in a valve body by one end of a plunger which at its opposite end is in a piston-cylinder relationship with an elongated rigid heat-conducting tube filled with a specially-formulated thermally-responsive substance. A loading spring acts to thrust the plunger into the tube with a substantial force insuring that at low temperatures the plunger normally both preserves the valving member seated and compresses the thermally-responsive substance to a minimum volume. In preparing the expansible fill, a liquid material such as a synthetic monomer which can be cured to elastomeric form at high temperature in the presence of a catalyst, is first thoroughly mixed with a melted wax, which is then permitted to cool and form a thick mixture of somewhat creamy consistency. The wax which is used is selected for its melting point, which is at about the temperature intended to occasion positive unseating of the valving member, and only up to about 30–40% by weight of wax is introduced into the mixture. Subsequently, the thick mixture is flowed into the rigid tube, in the presence of a catalyst for the rubber, and when the desired volume is realized the filled tube is brought up to the curing, or vulcanizing, temperature for a sufficient time to cause substantially all of the rubber to be cured. The resulting homogeneous substance is of an essentially dry elastomeric character, which expands and softens but does not bleed at temperatures in excess of the original melting temperature of the wax. As the temperature of the tube is raised by external exposure to hot water up to a critical temperature which is about the same as the wax melting temperature, the fill suddenly expands at a very significantly higher rate than before and abruptly moves the plunger and valving member with high thrust for a relatively large distance in the unseating direction, against restraint of the loading spring.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

FIGURE 1 provides a partly cross-sectioned and partly pictorial side view of a relief valve assembly in which teachings of the present invention are practiced;

FIGURE 2 is a view of portions of a typical installation involving the relief valve of FIGURE 1;

FIGURE 3 portrays graphically the critical changes in volumes of a family of specially-prepared thermally-responsive substances within a predetermined narrow range of temperatures which are of interest for a thermostat operation; and FIGURE 4 is a longitudinal cross-section of a further thermal actuator construction useful in assemblies such as the relief valve of FIGURE 1.

The typical temperature-responsive assembly characterized in FIGURE 1 is that of an automatic relief valve, which includes a thermal actuator or sensing unit 5 in association with a normally-closed valve unit 6. As in exemplified in FIGURE 2, such an assembly is useful in relieving pressures within a hot water storage tank 7, the installation being sealed at the top of the tank with the sensing unit 5 disposed in the water at the top of the tank. The usual water inlet 8 and hot water outlet 9 are illustrated, and the automatic relief valve unit 6 is normally closed to prevent fluid egress through the drain pipe 10. Valve unit 6 includes a movable valving member 12 which is normally forced into tight seating and sealing relationship with a valve seat 13 formed in the valve body 14 around a relief flow passageway 15 between the upstream and downstream ends, 14a and 14b, respectively, of the valve unit. Seating thrust is developed by a compressed load spring 16 which acts between the valve body and the movable valving member 12, and which is set at the factory to permit unseating of the valving member at a predetermined tank pressure, such as a relieving pressure within the range of 75–175 p.s.i. The valving member is also fixed with a slidable shaft 17 which is sealed in relation to the body cover 18 by seal 19 and which is further pinned to an external handle 20 of a type which may be lifted manually to develop leverage needed to oppose force of spring 16 by camming with the top of cover 18.

In addiiton to automatic pressure relief and manually-controlled valving, the assembly also responds automatically to occurrence of critical water temperatures, as the result of unseating thrusts developed by the sensing unit 5; typically, a temperature just short of water boiling temperature, such as about 210° F., is selected as the critical actuating temperature. For this purpose, an elongated metal tube 21, such as a copper tube having good corrosion and thermal conductivity characteristics, is affixed near one of its ends, 22, to an internal valve body bracket 23 disposed on the upstream side of the valve, the opposite closed end 24 of the tube being oriented for immersion deeply within the hot water being sampled. A unique fill 25 of thermally-responsive material occupies the spaces within the hollow tubing 21, except where the movable plunger 26, rubber sealing sleeve 27, and closure members 28, 29 and 30 are located near the end 22. Fill 25 comprises a special compositon prepared from a liquid monomer of elastomeric material and molten wax, the composition being curved or vulcanized, in situ, to assume a dry semi-solid elastomeric form. The wax is selected to have a melting point at about the temperature at which a rather large and sudden movement of the plunger 26 is to be effected. As is well known, wax and like materials will undergo a substantial increase in volume upon conversion from solid to liquid states, the melting temperature falling within a predetermined limited range. In the case of a common petroleum-type waxes, for example, these may be obtained commercially with different melting temperatures, such as melting temperatures in a relatively low range of about 120–140° F. and in a relatively high range of 200–220° F. The waxes may in some instances be blended, as desired for certain applications. Wax alone is not satisfactory for present purposes, principally because of the sealing problems associated with the need for relative movements occurring while it is in the liquid (molten) state. Instead, advantageous thermal-response characteristics of the wax are brought into play, together with those of an elastomeric material, while the wax is included within a substance involving both the wax and the elastomeric material.

The thermal fill substance, 25, involving both of these materials is of a special character believed to comprise a so-called Clathrate inclusion compound. Clathrates are strong complex compounds in which there is thought to be enclosure or caging of the molecules of one component (guest) in a structure formed by molecules of another component (host). Some of the resulting properties may be those of the host component, others may be those of the guest component; in the formulation of interest for present purposes, the substance advantageously exhibits external surface and resiliency characteristics which are very much like those of a simple elastomeric body, although the wax (guest) component advantageously causes the substance to expand significantly at a temperature which is about that of the wax melting temperature. Importantly, when the substance is properly made, the wax does not bleed out of the substance to any notable extent at non-restructive temperatures above the melting temperature of the wax which has been used, nor, collaterally, does the elastomeric component (host) disclose rupture or otherwise evidence signs of deterioration in its desired effects after being cycled through the critical temperature range many times. The proportions of wax and elastomeric material must be carefully limited, however, to prevent both the unwanted bleeding and deterioration, and, in general, the wax should therefore not exceed about 40% of the substance, by weight. For optimum performance, the expansions which occur should be large, and this suggests that the percentages of wax should be at high levels, although even small percentages of wax can be beneficial in that they impart some improvement not only in thermal expansion characteristics but also in lowered tendencies of the elastomeric substance to adhere to side walls of the tube 21 within which it is confined. Reference to the family of curves in FIGURE 3 aids in an appreciation of the distinctively improved expansion vs. temperature characteristics which are obtained in this manner, the ordinate being in terms of mechanical stroke, i.e., positive change in length, in inches, developed by samples enclosed within a rigid tube to form a column normally 5.75 inches in length and suitable for use in a device such as that of the actuator under consideration, and the abscissa being graduated according to temperature, in degrees Fahrenheit. The critical temperature range of interest for these samples is about 210–220° F., where the curves 31, 32 and 33 exhibit a pronounced bend or "knee" evidencing a significant change in expansion for the substances involved. These curves represent thermally-responsive substances in which the wax content is, respectively, about 10%, 20% and 30%, by weight, the balance comprising essentially a silicone elastomer which has been cured to form the desired host component. By way of comparison, the characteristic of the same cured elastomer, alone, is represented by the substantially linear plot 34. Within the critical range, the inclusion of but 10% of wax (curve 31) occasioned more than twice the stroke of the elastomer alone (plot 34); 20% inclusion of wax (curve 32) developed more than three times the stroke; and a 30% inclusion of wax (curve 33) was responsible for about four and one half times the stroke realized with the elastomer only. It is of course apparent that the expansion characteristics of the elastomer itself contribute to the intended effects in the proper sense, and this is desirable, although the augmented strokes occasioned by the wax inclusion are striking and represent an important improvement.

Preparation of the thermally-responsive fill involves preliminary processing of the materials in liquid form and final processing, in the nature of curing, within the tube or other confined site where the substance is deposited. A liquid silicone monomer, or another liquid elastomeric monomer which will produce like effects, is first mixed with wax, such as a petroleum wax which melts within a temperature range of interest (example: 200–220° F.), in the proportions of not more than about 40% by weight of wax, and the balance the silicone monomer. These components may both be in liquid form, when they are being mixed, or the wax may subsequently be melted as the mixture is brought up to the melting temperature of the wax. The components are permitted to become uniformly mixed, as by being stirred thoroughly, at a temperature at or just above the wax melting temperature. This mixture must be devoid of any agent which would cause curing or vulcanizing of the elastomeric component, and the mixing should take place at a temperature which, while sufficient to melt the wax, is not so much higher that it will cause the wax in the mixture to take on a relatively coarse globular consistency in the cooled mixture. Excessive temperatures are readily detected and corrected because of the aforementioned globular or granular consistency which can result. Upon subsequent cooling of the mixture, it assumes a smooth creamy consistency desired to promote a substantially homogeneous end product; stirring need not be continued during the cooling period. At a temperature below the wax melting temperature and below the curing (i.e. cross-linking or vulcanizing) temperature of the elastomeric component, a curing agent suitable for inducing cross-linking of the elastomeric substance is blended into the mixture, in a powder or other known appropriate form and in a proportion commonly used for curing purposes. The resulting creamy mixture is then flowed evenly into a container, such as the tubular element 21, where it leaves substantially no voids within its mass. Curing is achieved by bringing the container and its contents up to a high temperature suitable for effecting a good cross-linking of the elastomeric component in the presence of its curing agent. Temperatures of between about 280–360° F. have been produced for this purpose in one practice of this invention involving a silicone elastomeric material. It is found that the curing operation should take place rapidly at least on the exterior of the confined mass, to develop an initial "skin" cure of the mass which thereafter advantageously suppresses tendencies of the wax component to bleed out as the cure progresses above the wax melting temperature. In furthering these purposes, the filled container is brought up to the curing temperature quickly, rather than gradually, and a convenient technique involves abruptly dipping the filled container into a bath of hot oil, which is maintained at a temperature such as about 300° F. The desired skin cure is effected almost immediately, and the heating is then continued in this manner, for about one-half hour in one case, to establish a thorough cure throughout the mass. Examination of samples prepared in this manner discloses that they are of a substantially homogeneous composition, with somewhat greater density of the cured elastomer near the exterior surfaces.

In the environment of its use (FIGURES 1 and 2), the thermal actuator unit is preferably closed, although producing the needed movements of its actuating plunger, 26, which may be of non-corrosive stainless steel. For these purposes, the cup-shaped rubber fitting 27 is mated tightly about the plunger, and, in turn, element 27 is fitted snugly within the enlarged upper end of the tube 21. An integral annular flange or lip of this cup-shaped fitting is compressed between the Teflon washer seal 29 and a shoulder of the tube where a compressible O-ring seal 30 is also present. Brass washer 28 is forced inwardly by the partly curled-over edge at the tip of the tube 21, to preserve the desired compression of the seals. This assembly assures that the plunger is accurately guided in its intended linear movements, and that the thermal fill 25 will not find its way about the exterior of the cup-shaped seal in such amounts that it might cause undesired wedging of the plunger. At its flat upper end, plunger 26 is mated with and abuts a flat under surface of valving member 12, and is thus disposed to exert a longitudinal upward thrust which can unseat the valving member to open the valve and permit relief or drainage flow. As illustrated in FIGURE 1, the relief valve is closed, with the plunger 26 being held substantially fully depressed by force of the load spring 16. Under this condition, the cup-shaped fitting 27 is fully mated with the plunger, and the fill 25 is at about a minimum volume, indicating that the sensed temperature is at a level below the melting temperature of the wax involved. Increase of the sensed temperature through the critical range develops the rather abrupt increase in volume, and related stroke, characterized by the curves in FIGURE 2; as this occurs, the rubber fitting is pressed upwardly from below by the expanding fill and acts as a piston which forces the plunger upwardly from below. No appreciable amount of the fill can be trapped between the side walls of the tube and the rubber fitting 27 as the latter is subsequently depressed back to the illustrated condition when the fill is again cooled. The firm mating between the plunger 26 and fitting 27, and the sealing of the rim of the latter with the tube 21, excludes water and contaminants from the filled interior of the tube and from the areas along which the plunger and cup-shaped fitting are mated; the sealing need not be as tight and secure as would be needed to prevent escape of molten wax under pressure, however, because the wax remains entrapped or caged within the elastomeric host at all times during normal operating conditions. The wax inclusions at the surfaces of the thermal fill are effective, however, to provide a desirably low coefficient of friction which facilitates the fill expansions and contractions relative to those of the tube 21.

Thermally-responsive actuators which practice these teachings may assume a variety of forms, as will be evident to those skilled in the art. Another preferred construction, useful in structures such as that of the relief valve of FIGURES 1 and 2, involves a hollow tubular container 35 which is open at one end and which contains a filling 36 of a thermally-expansive substance which has the same characteristics as the elastomer-wax fill 25 in FIGURE 1 and is prepared in the same way. The actuator rod 37, which conveys the needed mechanical output strokes, is enlarged at one end to form a piston 38 readily slidable within the hollow container 35, the piston serving to align the rod for essentially linear movements. A sliding plug element 39, of a suitable plastic (such as Teflon) or elastomeric material, is disposed between the fill 36 and piston 38, where it can preclude entrapment of water or other foreign matter at that site and can therefore prevent the unit from developing false output signals. In addition, plug 39, like cup-shaped fitting 27 in FIGURE 1, fits firmly enough against side walls of the enclosure to preclude "pinching" of the fill, a result which would tend to deteriorate the fill and disturb proper operation of the unit. Pre-loading spring 40 is also located within the tube 35, conveniently surrounding the actuator rod, and exerts a thrust between the partly turned-over open end of the tube and the piston. Washer 41 aids in providing an abutment for one end of the spring, and also excludes gross sizes of contaminants from fouling the spring in use. Collar 42 affixed near the output end of tube 35 is an aid in mounting of the actuator unit. External load springs may also be employed, though not essential in some applications.

The coefficient of cubical expansion in the case of the wax used is greater than that of the elastomeric host material alone, and this has the advantageous effect of developing significantly greater pressures and stroke forces than where elastomeric material only is adopted as a fill. These greater forces permit the use of stronger load springs, which may be needed to insure more positive seating in certain valves, for example, or, in the instance of valves serving as pressure relief valves, such as that of FIGURE 1, may enable selection of pressure relief levels which are higher than would otherwise be possible yet without impairing the thermal response capabilities. Importantly, even relatively high levels of friction in actuated mechanisms can be overcome by the fill having wax inclusion, thereby promoting greater accuracies in operation. External load springs are desirable for the purpose of providing strong re-forming forces, particularly in those constructions wherein the special thermally-responsive fill is confined within a container in which close packing is desired at all times and wherein speed of such re-forming response may be important. It should be understood, however, that such springs are not essential in some applications, because the elastomer-wax inclusion compound does not inherently exhibit any troublesome hysteresis effect requiring compensation by a spring. For some applications, the enclosure itself may exert certain restoring forces, as in the case of conventional types of Bourdon-tube units wherein the tube is filled with an elastomer-wax inclusion compound. In other instances, auxiliary spring forces may be provided by a spring, such as a helical spring, which is actually embedded directly within the special inclusion compound.

Hydrocarbon waxes, and particularly mineral waxes used as microcrystalline waxes, are preferred in the actuator unit employed in the relief valve of FIGURES 1 and 2. The critical temperature range, within which the wax melts and a relatively abrupt change in dimensions occurs, need not be limited to the valves associated with hot water tank relief valves, however and, as is well known, waxes having the desired characteristics may be blended to have melting temperatures below 0° F. and up to 375° F. in the case of synthetic waxes, for example. In practice, batches of waxes from production lots have been sampled and tested empirically to determine their specific melting temperatures, after which those having appropriately different melting temperatures have been blended to produce the desired melting temperatures where these did not occur naturally in the sampled batches. Materials other than waxes are known to exhibit desirably large volume expansions upon melting, and these lend themselves to use in lieu of wax where they can be formed into the guest component of a suitable Clathrate inclusion; however, wax is particularly desirable, even in small percentages, because it has outstanding expansion vs. temperature characteristics and also reduces coefficient of friction of the fill preventing it from becoming excessively tacky at very high temperatures.

Liquid guest components are of value for certain applications of the essentially dry thermally responsive actuators even though they may not be expected to undergo transitions from solid to liquid phases in use. It is necessary, however, that such liquid components be well retained or captured by the host, without bleeding significantly, and that they not attack the host material. The effective expansion and contraction characteristics of a given rubber host component may thus be closely regulated by incorporating a liquid guest having expansion and contraction characteristics which have either additive or subtractive influences. Liquid fluorinated compounds such as those marketed by Minnesota Mining and Manufacturing Company under the designations "FC 75," "FC 76," and "FC 43" are examples of liquid guest components useful in inclusion with rubber host components, these compounds existing and remaining stable in liquid form at temperatures up to 700–900° F. and solidifying at temperatures so low as to be of no consequence in the type of thermal actuators illustrated and described herein. Silicone rubber host material may capture water as a guest material, thereby forming an essentially dry thermally-responsive element which experiences relatively large and sudden changes in volume as its temperature is varied through a range including the boiling point of the guest. The cross-linking or curing of the host material, which occurs at a relatively high temperature, is achieved without vaporization of the guest by maintaining the ambient pressure at a high enough level, either in a pressurized vessel or in a closed tube, the latter conveniently being the same tube in which the fill is to be contained in later use in an actuator structure. The useful liquid guest materials, such as saturated or unsaturated hydrocarbons having the bonding characteristic $C_nH_{2n}$ and which have boiling points at desired levels and do not attack the natural or artificial host materials in which they are included, permit design of a wide variety of actuators producing relatively large volumetric changes at desired temperatures corresponding to the boiling points of the guests.

The elastomeric materials forming the host components of the inclusion-type compounds should exist in liquid form prior to curing, for purposes of facilitating preparation of a well-mixed initial combination of the wax and elastomer. So-called "RTV" (room-temperature-vulcanizing) rubbers meeting the requirements are commercially available from Dow-Corning Corporation, General Electric Company, and Union Carbide Corporation; liquid silicone monomers of this type are cross-linked or cured with standard commercially-available curing agents, which also may be in liquid form, and the normally relatively long curing time associated with these materials is purposely accelerated, for reasons already mentioned, by quickly elevating the temperature of the mixture plus curing agent once it is located in the intended site. Thiokol rubbers, which are polysulphides of organic dihalides, and silicone rubber polysiloxanes, and styrene rubbers as comonomers with butadiene, have the desired characteristics. In the case of silastic "RTV" material, the catalyst or curing agent may be organometallic salts, such as stannous octoate, and lead octoate mixed with inert material, a common ratio being about four parts of catalyst to one-hundred parts of silastic, for example. One satisfactory liquid elastomeric monomer is "Silgard 182 Resin," obtained from Dow-Corning Corporation, with which is used Silgard 182 Curing Agent, obtained from the same source, a suitable curing temperature being in the range of about 149–342° F. Materials other than those commonly thought to be highly elastomeric may be benefitted in the same way, specifically flexible plastics and those which are more rigid than many rubbers and which are cross-linkable to produce the desired wax inclusions, such as polyvinylchloride (PVC). In the latter connection, it should be appreciated that many useful thermally-responsive devices may also include blocks or other shaped forms of the thermally-responsive substance, without closely-surrounding enclosures or containers, in which temperature-induced dimensional variations of the substance cause output actuations or indications.

Although specific preferred practices and embodiments of this invention have been shown and described, it should be understood that various changes, modifications, additions and substitutions may be effected by those skilled in the art without departure from these teachings, and it is aimed in the appended claims to embrace all such variations as fall within the true spirit and scope of the invention.

What I claim as new and desire to secure by Letters Patent of the United States is:

1. In a thermally responsive actuator, a support, a body of substantially homogeneous thermally expansible compound mounted on said support for actuating movement in relation to said support in response to temperature-induced dimensional variations in said compound, said body of thermally expansible compound consisting essentially of a substantially dry and flexible cured host component and an uncured guest component distributed substantially uniformly therethrough, said guest component exhibiting expansion and contraction characteristics during transitions through a predetermined range of temperatures which includes the temperatures at which said guest component exists in the liquid phase which are different from the expansion and contraction characteristics of said host component alone, whereby said body of thermally expansible compound undergoes predetermined changes in dimensions upon changes in temperature thereof through said range.

2. In a thermally responsive actuator, a support, actuated means movable in relation to said support, and a body of substantially homogeneous thermally expansible compound mounted on said support for movement of said actuated means in response to temperature-induced dimensional variations in said compound, said body of thermally expansible compound consisting essentially of a substantially dry and cured host compound and an uncured guest component distributed substantially uniformly therethrough, said guest component exhibiting expansion and contraction characteristics during transitions through a critical range of temperatures which includes the temperatures at which said guest component exists in the liquid phase which are materially greater than from the expansion and contraction characteristics of the material of said host component alone, said cured host component being substantially infusible at operating temperatures of said actuator, whereby said body of thermally expansible compound undergoes a substantially abrupt change in dimensions upon change in temperature thereof through said critical range.

3. In a thermally responsive actuator, a support, actuated means movable in relation to said support, and a body of thermally expansible compound mounted on said support for movement of said actuated means in response to temperature-induced dimensional variations in said compound, said body of thermally expansible compound consisting essentially of a cured elastomeric host compound and a wax guest compound distributed substantially uniformly therethrough, said wax guest component exhibiting a materially greater expansion and contraction than the material of said elastomeric host component alone when exposed to predetermined temperatures at which said wax guest component passes between solid and liquid phases, whereby said body of thermally expansible compound undergoes a substantially abrupt change in dimensions upon change in temperature thereof in the vicinity of said predetermined temperatures.

4. In a thermally responsive actuator as set forth in claim 3, a body of thermally expansible compound wherein said elastomeric host compound comprises a silicone rubber which exists in a liquid form before curing, and wherein said wax guest compound comprises a mineral wax, said wax guest component comprising up to about forty percent of said compound by weight.

5. The method of manufacturing a thermally responsive actuator in which a body of thermally expansible material is mounted on a support for actuating movement in relation to the support, which comprises mixing a liquid cross-linkable material with a lesser amount of another material in liquid form which exhibits expansion and contraction characteristics during transitions through a predetermined range of temperatures which includes the temperatures at which said other material exists in the liquid phase which are different from the expansion and contraction characteristics of said cross-linkable material when cross-linked into a substantially solid state, and subsequently cross-linking only the cross-linkable material while it is in admixture with said other material to form said body in a substantially solid homogeneous state.

6. The method of manufacturing a thermally responsive actuator in which a body of thermally expansible material is mounted on a support for movement of an actuated member carried by the support, which comprises mixing at an elevated temperature a liquid cross-linkable elastomeric material with a lesser amount of another material in liquid form which exhibits expansion and contraction characteristics during transitions through a predetermined range of temperatures which includes the temperatures at which said other material exists in the liquid phase which are materially greater than the expansion and contraction characteristics of said cross-linkable material when cross-linked into a substantially solid state, adding a cross-linking agent for the cross-linkable material and heating the mixture to cross-link only the cross-linkable material and, thereby, to form said body in a substantially solid homogeneous state with said other material captured therein.

7. The method of manufacturing a thermally responsive actuator in which a body of thermally expansible material is mounted on a support for movement of an actuated member carried by the support, which comprises mixing an uncured liquid elastomeric material with a lesser amount by weight of melted wax which exhibits a materially greater expansion and contraction during transitions thereof through a predetermined critical range of temperatures which includes the melting temperature thereof than does said liquid elastomeric material when cured to a substantially solid elastomeric state, subsequently adding a curing agent to the mixture, and heating the mixture up to a high temperature above said melting temperature to cure the elastomeric material and, thereby, to form said body in substantially homogeneous state.

8. The method of manufacturing a thermally responsive actuator as set forth in claim 7 in which said mixing is performed with up to about forty percent of wax, by weight, at an elevated temperature at which said wax is molten and in which said uncured liquid elastomeric material is silicone rubber in uncured liquid form, and further comprising the step of causing the mixture to cool to a temperature below the melting temperature of the wax and, thereby, to assume a substantially creamy flowable condition before adding the curing agent thereto.

9. The method of manufacturing a thermally responsive actuator in which a body of thermally expansible material is disposed within a hollow casing mounted on a support and in which an actuated member is mounted for movement relative to the support by temperature-induced changes in the dimensions of the thermally expansible material, which comprises thoroughly mixing an uncured elastomeric silicone material in liquid form with up to about forty percent by weight of melted wax which exhibits a materially greater expansion and contraction during transitions thereof through a predetermined critical range of temperatures which includes the melting temperature thereof than does the silicone material when cured to elastomeric form, mixing a heat-responsive curing agent for the silicone material with the mixture while it is cooled below the melting temperature of the wax, introducing the mixture with the curing agent therein into the casing in flowable form, quickly heating the mixture at a temperature above the melting temperature of the wax while it is in the casing to cure at least the exterior portions of the mixture substantially at once, and thereafter continuing the heating until substantially all of the silicone material is cured in entrapping relationship to the wax therein.

10. A thermally responsive actuator comprising a support, a hollow casing mounted on said support, a body of thermally expansible material cast and at least partly filling said casing, an actuated member mated with said casing for movement relative thereto in response to temperature-induced changes in the dimensions of said body of expansible material, said cast body of expansible material consisting essentially of a substantially dry and homogeneous inclusion of wax within a greater amount of a cured elastomeric material, said wax having a materially greater expansion and contraction during transitions thereof through a predetermined critical range of temperatures which includes the melting temperature thereof than does the cured elastomeric material alone, whereby said actuated member is moved substantially abruptly and forcefully when the casing and body of material are raised in temperature through said predetermined range of temperatures.

References Cited by the Examiner

UNITED STATES PATENTS

| | | | |
|---|---|---|---|
| 2,259,846 | 10/41 | Vernet et al. | 252—1 |
| 2,736,604 | 2/56 | Albright | 60—23 X |
| 2,938,384 | 5/60 | Soreng et al. | 73—358 |
| 2,990,716 | 7/61 | Butts | 73—363 |
| 3,075,348 | 1/63 | Baker | 60—23 |

JULIUS E. WEST, *Primary Examiner.*

EDGAR W. GEOGHEGAN, *Examiner.*